United States Patent
Van Buggenhout et al.

(10) Patent No.: US 9,989,405 B2
(45) Date of Patent: Jun. 5, 2018

(54) INFRARED SENSING DEVICES AND METHODS

(71) Applicant: Melexis Technologies NV, Tessenderlo (BE)

(72) Inventors: Carl Van Buggenhout, Aalst (BE); Ben Maes, Lommel (BE); Karel Vanroye, Sint-Truiden (BE); Stijn Reekmans, Beverlo (BE)

(73) Assignee: MELEXIS TECHNOLOGIES NV, Tessenderlo (BE)

( * ) Notice: Subject to any disclaimer, the term of this patent is extended or adjusted under 35 U.S.C. 154(b) by 21 days.

(21) Appl. No.: 15/211,123

(22) Filed: Jul. 15, 2016

(65) Prior Publication Data

US 2017/0016762 A1   Jan. 19, 2017

(30) Foreign Application Priority Data

Jul. 17, 2015   (GB) .................................. 1512492.8

(51) Int. Cl.
*G01J 5/02* (2006.01)
*G01J 1/02* (2006.01)
(Continued)

(52) U.S. Cl.
CPC ........... *G01J 1/0252* (2013.01); *G01J 1/4228* (2013.01); *G01J 5/06* (2013.01); *G01J 5/12* (2013.01);
(Continued)

(58) Field of Classification Search
CPC ........... G01J 1/0252; G01J 1/4228; G01J 5/12
(Continued)

(56) References Cited

U.S. PATENT DOCUMENTS

| 2005/0141058 A1* | 6/2005 | Raynor | G01N 21/253 358/504 |
| 2010/0193706 A1* | 8/2010 | Shen | G01J 3/26 250/474.1 |
| 2014/0091220 A1* | 4/2014 | Li | G01J 5/20 250/340 |

FOREIGN PATENT DOCUMENTS

| WO | 0136926 A1 | 5/2001 |
| WO | 2015120210 A1 | 8/2015 |

OTHER PUBLICATIONS

Great Britain Search Report from GB Application No. GB1512492.8, dated Jan. 13, 2016.

* cited by examiner

*Primary Examiner* — David Porta
*Assistant Examiner* — Meenakshi Sahu
(74) *Attorney, Agent, or Firm* — Workman Nydegger

(57) ABSTRACT

An infrared sensor assembly for sensing infrared radiation from an object is disclosed. The infrared sensor assembly comprises a sensor array comprising a plurality of sensing elements, provided on or embedded in a substrate extending in a substrate plane. The sensor array comprises at least two infrared sensing elements, each infrared sensing element having a radiation responsive element providing a proportionate electrical signal in response to infrared radiation incident thereto and at least two blind sensing elements, at least one blind sensing element being interspersed among the at least two sensing elements, each blind sensing element being shielded from incident infrared radiation from the object and providing a proportionate electrical signal in response to parasitic thermal fluxes. The output of the sensor array is a function of the infrared sensing elements and of the blind sensing elements such that parasitic thermal fluxes are at least partly compensated for.

18 Claims, 3 Drawing Sheets

(51) Int. Cl.
 *G01J 5/06* (2006.01)
 *G01J 5/12* (2006.01)
 *G01J 1/42* (2006.01)
(52) U.S. Cl.
 CPC ... *G01J 2005/066* (2013.01); *G01J 2005/068* (2013.01)
(58) Field of Classification Search
 USPC ..................................................... 250/340
 See application file for complete search history.

Lengend:
■ 300, 301
☐ 200, 201

Lengend:
■ 300, 301
□ 200, 201

INFRARED SENSING DEVICES AND METHODS

FIELD OF THE INVENTION

The present invention relates in general to infrared (IR) sensing devices, and more specifically to a thermal infrared sensing device.

BACKGROUND OF THE INVENTION

IR sensors are used to measure temperatures and/or provide images of remote objects in a scene by detecting the infrared radiation emitted from the target object impinging upon a sensing array. Likewise, IR sensors with a single pixel are used to measure the temperature of an object that illuminates the whole field of view of that sensor.

Ideally the sensing array should output a uniform response when it views an infrared source that produces a uniform amount of radiation.

A sensing array typically comprises an array (grid) of pixels each individually responsive to infrared radiation. In for example a microbolometer, each pixel consists of a thermally isolated "bridge" of resistive material that is heated by incident radiation. The resistance of the bridge varies with its temperature and this variation in resistance is used to generate an output related to the intensity of incident radiation. Another example of thermal infrared sensing devices are sensors based on thermopiles.

In practice infrared sensor arrays are subject to a large amount of non-uniformity between pixels i.e. when exposed to the same amount of radiation each pixel produces a different response. The raw output from such arrays is dominated by this effect and is not recognizable as an image. As this is the case, infrared cameras known in the art apply a correction to the raw output of the array. A known correction is to generate a table of individual correction factors to be applied to the outputs of each pixel in the image.

Additional problems are encountered if the temperature of the sensing array varies, for example as a result of local hot spots in the sensor or by external heat sources surrounding the sensor, as the appropriate correction factors also vary with temperature. When the temperature of the sensor array varies, the latter creates inevitable linear and non-linear thermal gradients over the sensor.

A thermal gradient over the pixels results in a different pixel temperature for each of the pixels. The thermal infrared sensor with its pixels is situated in a certain environment. That environment has a temperature and it could also be that the environment is closed by a certain boundary (e.g. a cap on top of the sensor or another object at a certain temperature). Because of the thermal heat transfer between the environment or cap or other object towards the pixels, the pixels could be heated up differently because of the fact that their pixel temperatures are different or because of the fact that the thermal resistance from the environment to the pixels is different.

One way in which this problem is dealt with is to characterize the array performance at one or more temperatures and then to use dedicated sensors provided on the array, typically blind pixels, thermistors or similar, to measure the current array temperature. A temperature dependent interpolation can then be carried out to estimate a suitable adjustment to the correction factors. However, due to the extreme sensitivity of the correction factors to array temperature, it is difficult to apply this technique sufficiently accurately to provide an accurate temperature measurement.

There is still room for improvement or alternatives.

SUMMARY OF THE INVENTION

It is an object of embodiments of the present invention to provide a sensor assembly suitable for sensing infrared radiation with good thermal stability.

The above objective is accomplished by a method and device according to the present invention.

The present invention relates to an infrared sensor assembly for sensing infrared radiation from an object, the infrared sensor assembly comprising a sensor array comprising a plurality of sensing elements, provided on or embedded in a substrate extending in a substrate plane, wherein the sensor array comprises at least two sensing elements, each sensing element having a radiation responsive element providing a proportionate electrical signal in response to infrared radiation incident thereto (LIVE pixel) and at least two blinded sensing elements, at least one blind sensing element being interspersed among the at least two sensing elements, each blinded sensing element being shielded from incident infrared radiation from the object and providing a proportionate electrical signal in response to parasitic thermal fluxes, whereby the output of the sensor array is a function of the infrared sensing elements and of the blind sensing elements such that parasitic thermal fluxes are at least partly compensated for. The function is a function of a sum of the signals of the plurality of the infrared sensing elements and a sum of the signals of the plurality of blind sensing elements such that parasitic thermal fluxes are at least partly compensated for. In embodiments of the present invention at least two blind sensing elements may be interspersed among the at least two sensing elements.

The function may be a subtractive function of a sum of the signals of the plurality of the infrared sensing elements and a sum of the signals of the plurality of blind sensing elements such that at least linear and/or non-linear thermal gradients over the sensor array are cancelled.

The parasitic thermal fluxes can be due to parasitic infrared radiation incident on the blind sensing element or due to thermal conductance through the solid or gas phase.

It is an advantage of embodiments of the present invention that the output corresponding with a function of signals of the LIVE pixels and signals of the BLIND pixels compensates for the parasitic thermal effects induced by the environment, e.g. the cap temperature or environmental temperature which normally may induce thermal gradients. It thus is an advantage of embodiments of the present invention that accurate detection of infrared radiation stemming from a scene can be measured.

It is an advantage of embodiments of the present invention that linear and non-linear gradients in a first and a second direction are compensated.

It is an advantage of specific embodiments of the present invention that non-linear thermal gradients in the diagonal direction are compensated.

It is an advantage of embodiments of the present invention that processing of the signals can be performed in an integrated or an external processor.

Where in embodiments of the present invention, reference is made to a pixel array, reference is for example made to a matrix of pixels, but also to a group of pixels forming a 2 dimensional collection of pixels.

Said subtractive function may correspond with a sum of the signals of the plurality of the infrared sensing elements minus a multiplication of a proportionality factor and a sum of the signals of the plurality of blind sensing elements.

Any of said sum of the signals of the plurality of the infrared sensing elements and/or said sum of the signals of the plurality of blind sensing elements may be a weighted sum wherein for each of the pixels a weighing factor is taken into account.

The center of the sensor array may be matched with the center of a cap covering the sensor array or with respect to an external environment inducing non-linear thermal gradients. It is an advantage of embodiments of the present invention that the matching of the pixel array with the cap or external environment inducing non-linear thermal gradients can be easily obtained.

The blind sensing elements and the infrared sensing elements may be configured for each having a field of view substantially corresponding with the field of view of the infrared sensor assembly.

The infrared sensor device may comprise a processor for subtractive processing of the electrical signal output of the plurality of the infrared sensor elements of the sensor array together with the output of the plurality of blind sensor elements of the sensor array, thus cancelling the signal distortion caused by thermal gradients of the sensor array. It is an advantage of embodiments of the present invention that the processing can be implemented in a hardware based as well as a software based processor.

Alternatively, the signal of the live and blind pixels may be subtracted from each other in the analog domain by connecting the pixels in anti-series so the generated voltage is subtracted. This is however only possible for thermal sensing elements which generate a voltage signal, such as thermopiles.

The infrared sensor assembly may further comprise means for sampling and digitizing the output of the plurality of infrared sensing elements of the sensor array together with the plurality of blind infrared sensing elements of the sensor array.

Each row and/or each column of the sensor array may comprise at least one blind sensing element.

The sensor array may comprise a same amount of infrared sensing elements and blind infrared sensing elements.

Each row and/or each column of the sensor array may comprise a same amount of infrared sensor elements and blind infrared sensor elements, and the sensor elements are arranged in a checkerboard arrangement.

The sensor array may be a 2×2 sensor array wherein the main diagonal elements of the sensor array only comprise blind sensing elements.

Each corner of the sensor array may comprise a blind sensing element and the sensor array further may comprise at least one blind sensing element interspersed in between the at least two infrared sensing elements.

The sensor array may comprise a same amount of rows and columns.

The infrared sensor assembly may further comprise a scanning shift register for selecting a row of the sensor array to be read out.

The infrared sensing elements and blind infrared sensing elements each may have a same layout. It is an advantage of embodiments of the present invention that the infrared sensor elements and blind infrared sensor elements are perfectly matched.

Channels may be provided between the infrared sensor elements and blind infrared sensor elements of the sensor array. It is an advantage of embodiments of the present invention that the thermal resistance from the cap to the pixels is the same for all the pixels. It is an advantage of embodiments of the present invention that it is guaranteed that the pressure of the sealed environment is the same for all the pixels.

The present invention also relates to an infrared sensor assembly comprising a sensor array for providing an image signal of a scene, the sensor array comprising a plurality of infrared sensing elements and blind infrared sensing elements, wherein the sensor array comprises channels which are provided between the plurality of infrared sensor elements and blind infrared sensor elements.

The present invention further relates to a method for sensing an infrared signal from an object using an array comprising a plurality of infrared sensing elements, the method comprising sensing a signal using at least two infrared sensing elements comprising a radiation response element providing a proportionate electrical signal in response to infrared radiation incident thereto, sensing a signal using at least two blind sensing elements interspersed among the at least two sensing elements, each blind sensing element having a radiation responsive element being shielded from the object providing a proportionate electrical signal in response to parasitic thermal fluxes, and processing the signals such that the output of the sensor array is a function of the infrared sensing elements and of the blind sensing elements such that parasitic thermal fluxes are at least partly compensated for. The function is a function of a sum of the signals of the plurality of the infrared sensing elements and a sum of the signals of the plurality of blind sensing elements such that parasitic thermal fluxes are at least partly compensated for.

Said processing may comprise deriving the output as a subtractive function corresponding with a sum of the signals of the plurality of the infrared sensing elements minus a multiplication of a proportionality factor and a sum of the signals of the plurality of blind sensing elements.

Said processing may comprise deriving the output as a subtractive function wherein any of said sum of the signals of the plurality of the infrared sensing elements and/or said sum of the signals of the plurality of blind sensing elements is a weighted sum wherein for each of the pixels a weighing factor is taken into account.

In one aspect, the present invention also relates to an infrared sensor assembly for sensing infrared radiation from an object, the infrared sensor assembly comprising a sensor array comprising a plurality of sensing elements, provided on or embedded in a substrate extending in a substrate plane, wherein the sensor array comprises at least two sensing elements, each sensing element having a radiation responsive element providing a proportionate electrical signal in response to infrared radiation incident thereto (LIVE pixel) and at least two blinded sensing elements, at least one blind sensing element being interspersed among the at least two infrared sensing elements, each blinded sensing element being shielded from incident infrared radiation from the object and providing a proportionate electrical signal in response to parasitic thermal fluxes, whereby the output of the sensor array is a function of the infrared sensing elements and of the blind sensing elements such that parasitic thermal fluxes are at least partly compensated for. The blind sensing elements and the infrared sensing elements are configured for each having a field of view substantially corresponding with the field of view of the infrared sensor assembly. The function may be a function of the sum of the signals of the infrared sensing elements and the sum of the signals of the blind sensing elements. Further optional features and advantages may be as described in parts of the other aspects of the present invention.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

Figure 1:
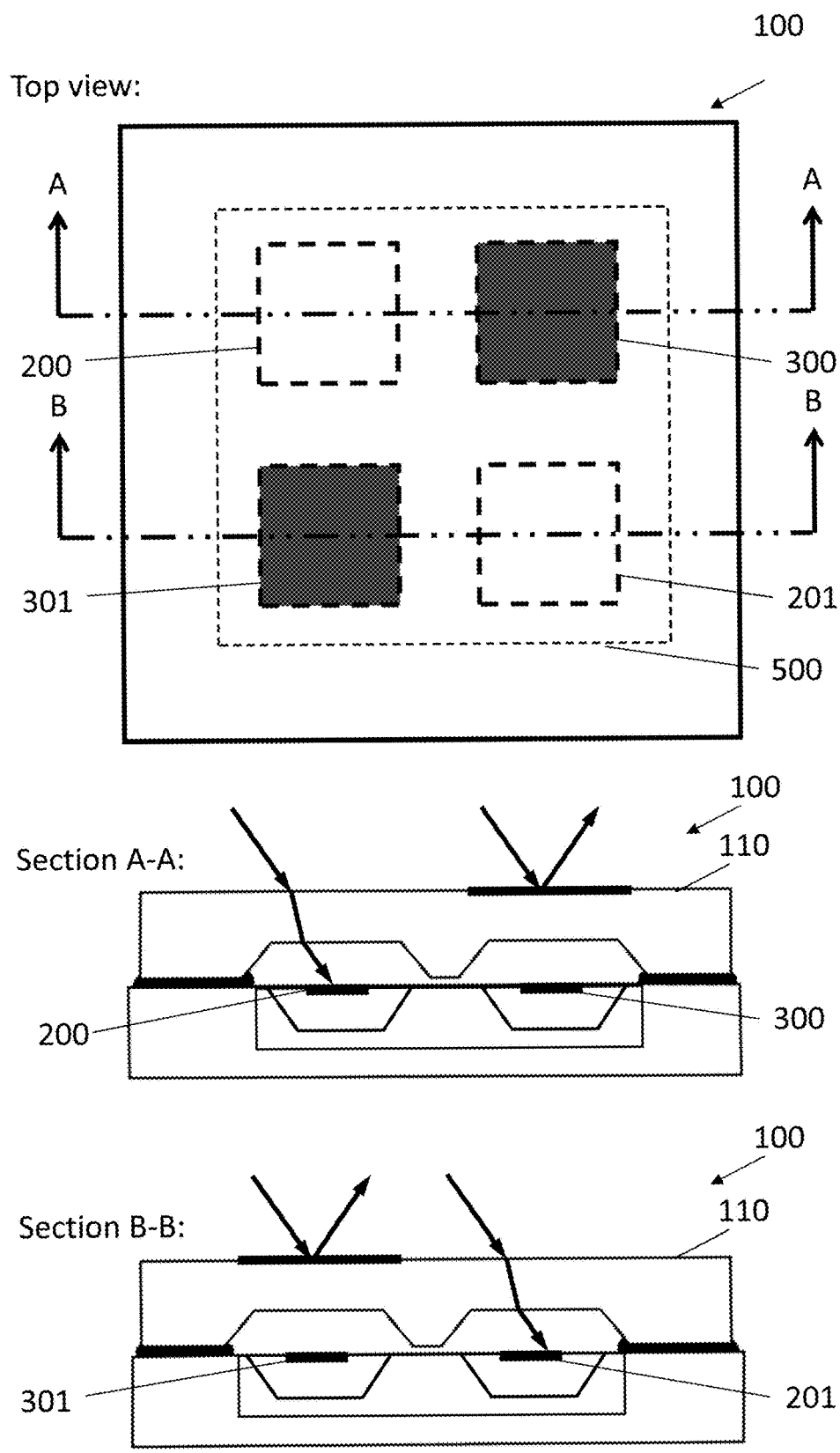
FIG. 1 illustrates an example of a sensor array that can benefit from embodiments of the present invention.

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly, it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

A "sensing element" in the context of embodiments of the present invention is an element which receives a signal, processes it and provides a measurable output. In particular embodiments, the signal refers to electromagnetic radiation in the infrared region, and the sensing element may comprise an integrated circuit, a MEMS, a thermopile or similar measuring systems, which are capable to transform the received signal into an electric signal for example a voltage, which may be then transferred to a readable output (for instance, a display).

Where in embodiments of the present invention reference is made to "cap", reference is made to a cover that protects the sensing element. Some embodiments of the present invention comprise a semiconductor cap, for instance silicon or germanium—the invention not being limited thereto. In exemplary embodiments of infrared sensor arrays according to the present invention, the cap comprises a cavity which isolates the sensing element, which may assist in improving the signal-to-noise ratio.

Where in embodiments of the present invention reference is made to "infrared radiation", reference is made to radiation in the wavelength range from 1000 nm to 25000 nm, advantageously in the wavelength range from 5000 nm to 20000 nm Where in embodiments of the present invention reference is made to "blind sensing element", reference is made to blind reference detectors which may be shielded or otherwise not permitted to view the infrared signal of the object to be measured. Such a sensing element also may be referred to as a blind sensing element.

Where in embodiments of the present invention reference is made to "infrared sensing element", reference is made to a sensing element that measures the infrared radiation incident on the sensor assembly. It also may be referred to as an infrared sensing element.

Where in embodiments of the present invention reference is made to "channel" reference is made to a narrow body of air between the infrared sensor elements of the array. This may be provided by a gutter or a groove between the infrared sensor elements. There is no real restriction on the lateral dimensions of the channel and these may be for example in the range 10 μm to 1 mm. In one particular example, the height of the channel may for example range from 1 μm to 20 μm if the channel is made in the interface layer between a cap and a CMOS wafer. When an etched groove is used, the height can be larger than 20 μm.

Where in embodiments of the present invention reference is made to "interspersed" reference is made to scattering among or between other things; this can be done in a random or distributed pattern manner, for example by arranging blind infrared sensor elements among the infrared sensor elements at intervals. In embodiments where a 2×2 infrared detector array is provided the blind infrared sensor elements may be provided as the diagonal elements of the infrared detector array, resulting in an infrared detector array where the blind infrared sensor elements are interspersed between or among the infrared sensor elements, because part of the blind pixels are lying in between parts of the infrared sensor elements. In a specific embodiment an infrared detector array may comprise alternating blind infrared sensor elements and infrared sensor elements, defining a checkboard pattern, where the blind infrared sensor elements are interspersed in a distributed pattern manner.

In a first aspect, the present invention relates to a thermal infrared sensor assembly, making reference to a device formed by a sensing array and a stacked cap, whereby the sensor assembly comprising a sensor array comprising at least two blind sensing elements, at least one blind sensing element or at least two blind sensing elements being interspersed in between or among the at least two infrared sensing elements. Such a device thus is especially suitable for sensing radiation in the thermal infrared region. By way of illustration, embodiments of the present invention not being limited thereto, an exemplary sensor assembly according to embodiments of the present invention is described with reference to FIG. 1 to FIG. 3, illustrating standard and optional features.

Embodiments of the present invention provide a sensor array 500 which can be considered to be an infrared detector array. Referring now particularly to FIG. 1, an infrared radiation detector assembly comprising an infrared radiation detector array 500, and more specifically a 2×2 array, is shown in accordance with the present invention. The columns and rows of the array 500 are formed of a plurality of individual infrared sensing elements, like for example radiation detectors or "pixels" of the micro-cantilever type. Each individual detector 200, 201 includes an infrared radiation responsive member for providing a proportionate electrical signal to processing circuitry in response to infrared radiation incident to the detector array 500. The detectors in FIG. 1, illustrate blind infrared sensing elements or detectors 300, 301 wherein the sensing element is being shielded from incident infrared radiation and providing a proportionate electrical signal in response to parasitic thermal fluxes. The blind pixels 300, 301 are shown interspersed between the radiation detectors 200, 201 as main diagonal elements of the infrared radiation detector array 500. Those skilled in the art recognize that positioning of the blind pixels is not limited to the specific arrangement shown, and that alternative arrangements, some further examples being shown in FIGS. 2 and 3, are within the scope of the invention. The sensing elements may be separated from each other via channels, which physically separate the sensing elements.

Figure 2:
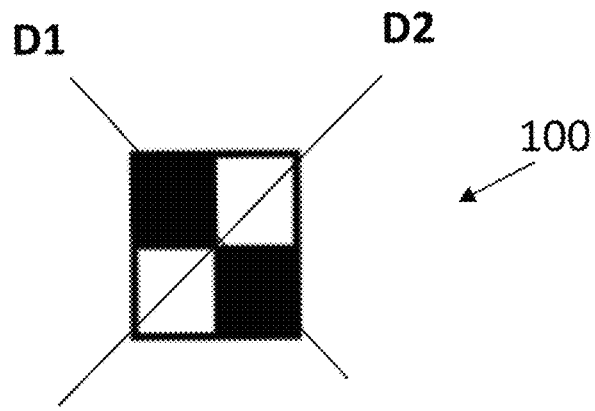
FIGS. 2(a)-2(c) and FIGS. 3(a)-3(c) illustrate different examples of possible configurations of interspersed sensing elements, according to embodiments of the present invention.
Figure 2:
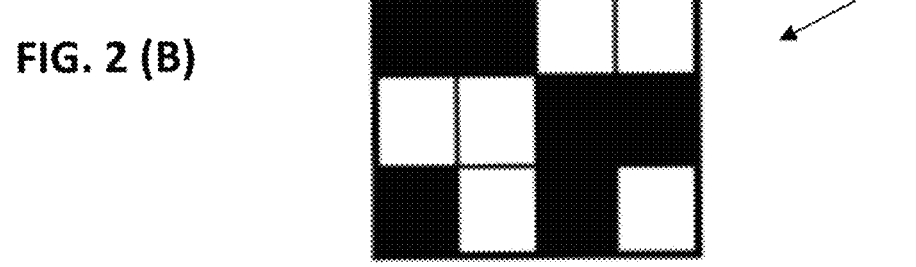
Figure 2:
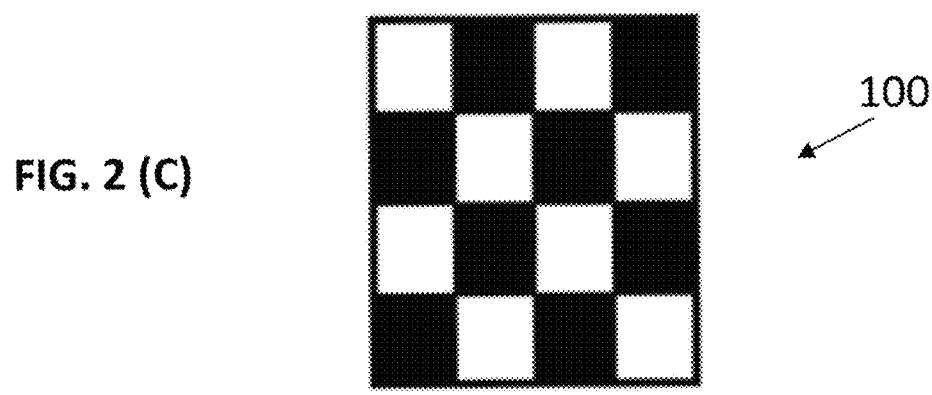

The infrared sensor assembly 100 may have a conventional design, such as for example illustrated in FIG. 1 illustrating an infrared sensor design having a cavity whereby the infrared sensor is covered by a cap 110.

In particular embodiments of the present invention, the cap 110 can be made of a semiconductor material, such as for example germanium or, more preferably, silicon crystal, or more generally any other material that is transparent to the radiation of interest (infrared). Advantageously, such material also is substantially opaque (e.g. has a transmission coefficient of at most 0.2, for example at most 0.1) to any other radiation, especially visible light, which is a common source of noise in infrared sensors. Embodiments of the present invention are not limited in the way of fabrication of the pixel. In the example of FIG. 1, the pixels are based on forming a cavity in a cap 110 and a cavity in a basic substrate being for example a CMOS, but embodiments of the present invention are not limited in the way of fabricating for example the cavity in the cap and the cavity in the CMOS. One example could be to create cavities by KOH etching, but other technologies exist too. The etch depth in the CMOS and the etch depth in the cap can be the same or can be different. Such a different etching depth can have a positive or negative effect on the parasitic thermal fluxes, as can be easily checked by the person skilled in the art.

Blind sensing elements can for example be created by providing for example a reflective coating on a top surface of the cap 110 substantially above the sensing element or for example a reflective coating on a bottom surface of the cap 110, although embodiments of the present invention are not limited thereto.

Once the sensing element receives the radiation, in particular embodiments of the present invention its energy is converted to an electrical signal, for instance through difference of potential in a thermopile, and the electrical signal is driven, for instance through an integrated circuit for processing the signal.

FIGS. 2(a)-(c) illustrate embodiments of the present invention illustrating how the at least two blind sensing elements are interspersed when the sensor array 500 is a square array, with the same number of rows and columns. FIG. 2(a) illustrates a 2×2 sensor array 500 according to an embodiment of the present invention employing the at least two blind sensing elements 300, 301 in the main diagonal. The latter checkerboard concept of two active of live sensing elements and two blind sensing elements advantageously can compensate for linear and/or non-linear thermal gradients in a first and a second direction, e.g. in X- and Y-direction which may be orthogonal or may be not orthogonal with respect to each other.

FIG. 2(b) illustrates an alternative embodiment of a 4×4 sensor array 500, having at least two blind sensing elements interspersed among the active or live sensing element 200, 201. Finally, FIG. 2(c) illustrates interspersing of the at least two blind sensing elements in a checkerboard pattern for a 4×4 sensor array, where a blind and live sensing element are alternatingly provided in the sensor array. In embodiments where square sensor arrays are provided the at least two infrared sensing elements and at least two blind infrared sensing elements are preferably provided such that the elements are symmetrical with respect to the diagonal D1, D2 of the array. In addition, said 4×4 checkerboard pattern advantageously not only compensates for linear and/or non-linear thermal gradients in a first and a second direction, e.g. X- and Y-direction which may be orthogonal or may not be orthogonal with respect to each other, and also compensate for non-linear thermal gradients in a diagonal direction of the pixel array.

Figure 3A:
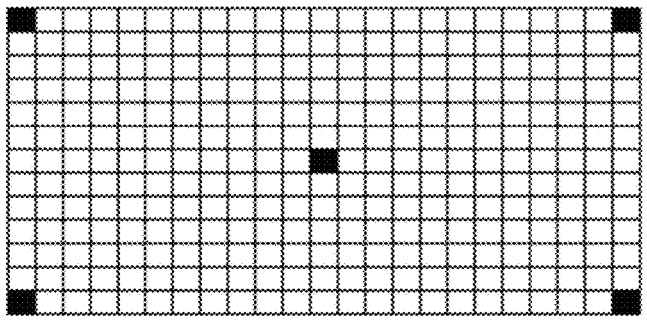
Figure 3B:
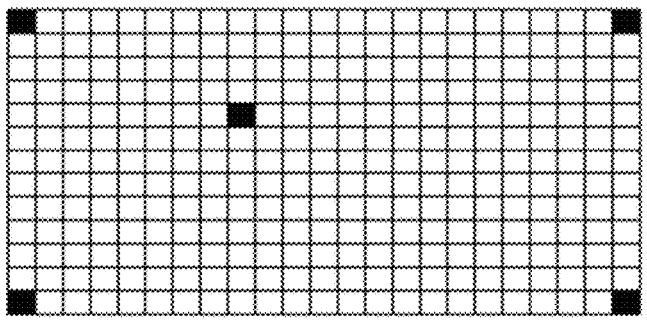
Figure 3C:
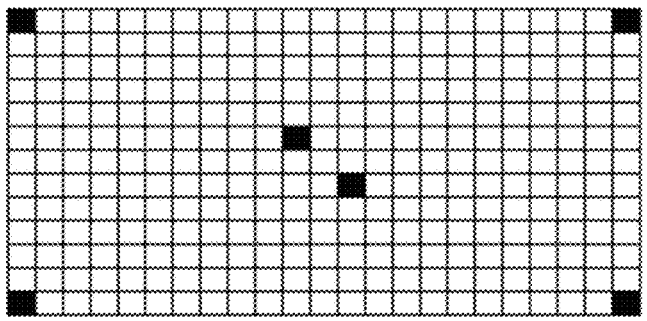

FIGS. 3(a)-(c) illustrate embodiments of the present invention illustrating where each corner of the sensor array comprises a blind sensing element and further at least one additional blind sensing element is interspersed in between the sensing elements, whereby said further blind sensing element enables one to know whether the distribution of the parasitic signal on the whole sensor array is a constant (due to no thermal gradients), or whether it's a non-linear distribution, and one then also may obtain the magnitude of the parasitic signal on the central active pixels of the pixel array, thereby being able to compensate for the non-linear thermal parasitic signal on all active pixels of the array.

Embodiments of the present invention are advantageous for infrared sensors and provide a solution for the problem that all the active pixels are placed at different locations and consequently these active pixels will also observe a different influence of the environmental parasitic effects. Although one wants to be only sensitive to the temperature of the object in the optical field of view of the sensor. The solution for compensating for these effects as employed in embodiments of the present invention is based on the fact that compensation can be done for thermal gradients, linear and non-linear, over the sensor using interspersed blind pixel.

Further, according to embodiments of the present invention, the output of the sensor array is a function of the infrared sensing elements and of the blind sensing elements such that parasitic thermal fluxes are at least partly compensated for.

The function may be a subtractive function of a sum of the signals of the plurality of the infrared sensing elements and a sum of the signals of the plurality of blind sensing elements. By providing the output as such a function, at least linear and/or non-linear thermal gradients over the sensor array can be cancelled. Such a processing of the signals can be for example performed in the digital field, after digitizing, where required, the signal outputs of the different sensing elements. Alternatively, the signal outputs of the different sensing elements can be processed in the analog domain by connecting the pixels in anti-series so the generated voltage is subtracted. The latter is possible where the signal outputs are voltage signals.

According to some embodiments, an infrared sensing element has a blind sensing element positioned on an isotherm occurring in the sensor assembly.

By way of illustration, embodiments of the present invention not being limited thereby, the following theoretical considerations can be made, illustrating features and advantages of embodiments of the present invention:

The heat flux from the environment or cap or other object to the sensing (LIVE) and reference (BLIND) pixels is a function of the temperature of the environment or cap or other object, the thermal resistance between the environment or cap or other object and each of the LIVE and BLIND pixels and the pixel temperature of the LIVE and BLIND pixels. Suppose that the design of the sensor is made in such a way that the thermal resistance between the environment or cap or other object and the LIVE pixel is exactly the same as the thermal resistance between the environment or cap or object and the BLIND pixel, and suppose that the environment or cap or other object is at a uniform temperature for the heat transfer towards each of the pixels, then still an offset could be created between the LIVE and BLIND pixels when their pixel temperatures are different. And this pixel temperature difference is influenced by local hot spots in the sensor or by external heat sources surrounding the sensor, which create inevitable linear and non-linear thermal gradients over the sensor and thus over the pixels. As a consequence, the subtracted signal of LIVE and BLIND pixels is sensitive to the temperature of an object outside the Field of View or the environment or cap for which the sensor is not allowed to be responsive. Embodiments of the present invention are therefore based on taking into account a function of outputs of the sensing elements and the reference elements, positioned interspersed between the sensing elements.

The solution provided in embodiments of the present invention are based on the fact that superposition of linear thermal gradients over the sensing/reference elements can be assumed. Therefore, if one looks to a thermal gradient in the horizontal X-direction (in-plane of the pixels) over the sensor, one can see that there exist isotherms on the sensor surface in the Y-direction. So by placing a sensing elements and reference elements on this isotherm in the Y-direction, one can compensate for thermal gradients in the X-direction. The latter can be obtained by using interspersed reference elements, positioned between the sensing elements. The same reasoning can be applied for a thermal gradient in the horizontal Y-direction (in-plane of the pixels), whereby advantageously the sensing element and a reference element are placed on the isotherm in the X-direction. Nevertheless, in some embodiments, the pixels can also be slightly misaligned compared to the isotherms. Such misalignments may occur e.g. by design and/or by processing. Positioning of the pixels on isotherms can be obtained using an interspersed configuration of measurement and reference pixels. Whereas the illustration above is discussed for perpendicular directions, the principle counts more generally when selecting isotherms in a first and second direction, which may or may not be orthogonal to each other and by applying a superposition principle for both directions.

As discussed above, processing of the signals according to embodiments of the present invention is performed by applying a function of the signals of the infrared sensing elements and the reference sensing elements. Some particular examples, embodiments of the present invention not being limited thereto are a subtractive function on the sum of the signals of the measurement (live) sensing elements and the sum of the signals of the reference (blind) sensing elements. Such an example of a subtractive function is given by $$\text{Output} = \text{Sum}(\text{Live}\_i) - K^*\text{Sum}(\text{Blind}\_j);\ i: 1 \ldots N;\ j: 1 \ldots M$$

with OUTPUT the resulting signal that is envisaged, i a counter for the N infrared sensing elements, j a counter for the M blind sensing elements and K a proportionality factor.

It is to be noticed that a subtractive function of the sum of the signals can be a mere subtraction of the sum of the signals of the infrared sensing elements and the sum of the signals of the blind sensing elements. In the above equation, the proportionality factor then becomes 1.

Nevertheless, a proportionality factor different from 1 (K< >1) also may be introduced to take into account a general variation for the blind sensing elements.

In other embodiments, the different sensing elements may show specific dependencies and in such a case an individual weighing factor may be used for the signal of each individual sensing element. The mathematical equation then becomes:

$$\text{Output} = \text{Sum}(c_i * \text{Live\_}i) - \text{Sum}(c_j * \text{Blind\_}j); \; i: 1 \ldots N; \; j: 1 \ldots M.$$

According to another aspect of the invention, at least one blind infrared sensing element and a scanning shift register provides an image signal of reduced fixed pattern noise and temperature stability. The scanning shift register may be adapted to select one of the infrared sensing elements which is read out and used to compensate the image sensing radiation detector.

The invention claimed is:

1. An infrared sensor assembly for sensing infrared radiation from an object, the infrared sensor assembly comprising:
    a sensor array comprising a plurality of sensing elements, provided on or embedded in a substrate extending in a substrate plane, wherein the sensor array comprises:
    at least two infrared sensing elements, each infrared sensing element having a radiation responsive element providing a proportionate electrical signal in response to infrared radiation incident thereto;
    at least two blind sensing elements, at least one of said two blind sensing elements being interspersed among the at least two sensing elements, each of said two blind sensing elements being shielded from incident infrared radiation of the object and providing a proportionate electrical signal in response to parasitic thermal fluxes,
    wherein an output of the sensor array is a subtractive function of a sum of the signals of the plurality of infrared sensing elements and a sum of the signals of the plurality of blind sensing elements such that at least linear and/or non-linear parasitic thermal fluxes are at least partly compensated for.

2. The infrared sensor assembly according to claim 1, wherein said subtractive function corresponds with a sum of the signals of the plurality of the infrared sensing elements minus a multiplication of a proportionality factor and a sum of the signals of the plurality of blind sensing elements and/or wherein said subtractive function is achieved by placing the sensors in circuit according to an anti-series schematic.

3. The infrared sensor assembly according to claim 1, wherein any of said sum of the signals of the plurality of the infrared sensing elements and/or said sum of the signals of the plurality of blind sensing elements is a weighted sum wherein for each of the pixels a weighing factor is taken into account.

4. The infrared sensor assembly according to claim 1, wherein each of the blind sensing elements and the infrared sensing elements have a full field of view that corresponds with the field of view of the infrared sensor assembly.

5. The infrared sensor assembly according to claim 1, the infrared sensor assembly comprising a cap covering the sensor array, wherein the center of the sensor array is matched with the center of the cap covering the sensor array or the center of the sensor array is matched to an external environment that induces non-linear thermal gradients.

6. The infrared sensor assembly according to claim 1, further comprising a processor for processing of the electrical signal output of the infrared sensing elements and of the blind sensing elements, thus cancelling the signal distortion caused by thermal gradients of the sensor array, and/or further comprising a processor programmed for subtractive processing of the electrical signal output of the plurality of the infrared sensor elements of the sensor array together with the output of the plurality of blind sensor elements of the sensor array, thus cancelling the signal distortion caused by thermal gradients of the sensor array.

7. The infrared sensor assembly according to claim 1, further comprising means for sampling and digitizing the output of the plurality of infrared sensing elements of the sensor array together with the plurality of blind infrared sensing elements of the sensor array and/or wherein parasitic thermal fluxes include a convolution of thermal gradients over the sensor array and wherein for each infrared sensing elements a blind sensing element is positioned on an isotherm in the pixel array, the isotherm being corresponding with one of the thermal gradients in the convoluted thermal gradients.

8. The infrared sensor assembly according to claim 1, wherein each row and/or each column of the sensor array comprises at least one blind sensing element.

9. The infrared sensor assembly according to claim 1, wherein the sensor array comprises a same amount of infrared sensing elements and blind infrared sensing elements and/or wherein each row and/or each column of the sensor array comprises a same amount of infrared sensor elements and blind infrared sensor elements, and the sensor elements are arranged in a checkerboard arrangement.

10. The infrared sensor assembly according to claim 1, wherein the sensor array is a 2×2 sensor array wherein the main diagonal elements of the sensor array only comprise blind sensing elements.

11. The infrared sensor assembly according to claim 1, wherein each corner of the sensor array comprises a blind sensing element and whereby the sensor array further comprises at least one blind sensing element interspersed in between the at least two infrared sensing elements and/or wherein the sensor array comprises a same amount of rows and columns.

12. The infrared sensor assembly according to claim 1, further comprising a scanning shift register for selecting a row of the sensor array to be read out.

13. The infrared sensor assembly according to claim 1, wherein the infrared sensing elements and blind infrared sensing elements each have a same layout.

14. The infrared sensor assembly according to claim 1, wherein channels are provided between the infrared sensor elements and blind infrared sensor elements of the sensor array.

15. An infrared sensor assembly comprising a sensor array for providing an image signal of a scene, the sensor array comprising a plurality of infrared sensing elements and blind infrared sensing elements, wherein the sensor array comprises channels which are provided between the plurality of infrared sensor elements and blind infrared sensor elements.

16. A method for sensing an infrared signal from an object using an array comprising a plurality of infrared sensing elements, the method comprising:
    sensing a signal using at least two infrared sensing elements comprising a radiation response element providing a proportionate electrical signal in response to infrared radiation incident thereto;
    sensing a signal using at least two blind sensing elements interspersed among the at least two sensing elements, each of said two blind sensing elements being shielded from incident infrared signal from the object, providing a proportionate electrical signal in response to parasitic thermal fluxes; and processing the signals such that the output of the sensor array is a subtractive function of a sum of signals of the plurality of infrared sensing elements and a sum of the signals of the plurality of blind sensing elements such that at least linear an/or non-linear parasitic thermal fluxes are at least partly compensated for.

17. The method according to claim 16, wherein said processing comprises deriving the output as a subtractive function corresponding with a sum of the signals of the plurality of the infrared sensing elements minus a multiplication of a proportionality factor and a sum of the signals of the plurality of blind sensing elements.

18. The method according to claim 17, wherein said processing comprises deriving the output as a subtractive function wherein any of said sum of the signals of the plurality of the infrared sensing elements and/or said sum of the signals of the plurality of blind sensing elements is a weighted sum wherein for each of the pixels a weighing factor is taken into account.

\* \* \* \* \*